United States Patent

Holub et al.

[15] 3,673,155

[45] June 27, 1972

[54] BIS(ORGANOSILYL)HYDROCARBON MODIFIED POLYAMIDES AND METHODS FOR MAKING THEM

[72] Inventors: Fred F. Holub; Abe Berger; Terry G. Selin, all of Schenectady, N.Y.

[73] Assignee: General Electric Company

[22] Filed: Dec. 3, 1969

[21] Appl. No.: 881,887

[52] U.S. Cl............................260/65, 117/128.4, 260/30.2, 260/30.4 N, 260/30.6 SB, 260/30.8 R, 260/30.8 DS, 260/31.4 R, 260/32.2, 260/32.4, 260/32.6 N, 260/33.4 P, 260/33.6 R, 260/37 N, 260/47 CZ, 260/47 CP, 260/78 R, 260/78 TF

[51] Int. Cl........................................................C08g 20/32

[58] Field of Search.............260/47 CZ, 47 CP, 78 R, 78 TF, 260/65

[56] References Cited

UNITED STATES PATENTS 3,392,144   7/1968   Holub...................................260/46.5

*Primary Examiner*—William H. Short
*Assistant Examiner*—L. L. Lee
*Attorney*—Richard R. Brainard, Joseph T. Cohen, Paul A. Frank, Charles T. Watts, William A. Teoli, Frank L. Neuhauser, Oscar B. Waddell and Joseph B. Forman

[57] ABSTRACT

Bis(aminoorganosilyl)hydrocarbons are employed in combination with organic diacids or organic dianhydrides to provide for the production of bis(organosilyl)hydrocarbon modified polyamides including polyamide acids. The bis(organosilyl)hydrocarbon modified polyamides also can contain chemically combined polydiorganosiloxane. The bis(organosilyl)hydrocarbon modified polyamides can be employed to make molding compounds, and polyamide and polyimide insulating films.

7 Claims, No Drawings

BIS(ORGANOSILYL)HYDROCARBON MODIFIED POLYAMIDES AND METHODS FOR MAKING THEM

The present invention relates to polyamides having chemically combined bis(organosilyl)hydrocarbon radicals and methods for making these materials.

The bis(organosilyl)hydrocarbon modified polyamides of the present invention, hereinafter referred to as "polyamides" have chemically combined bis(diorganosilyl)hydrocarbon modified polyamide units of the formula, (1) 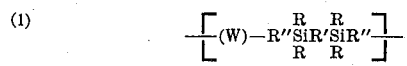

where W is a polyamide unit selected from,

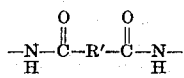

and polyamide acid units of the formula,

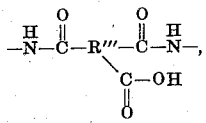

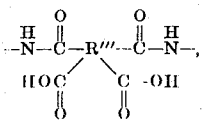

and

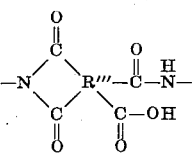

where R is selected from monovalent hydrocarbon radicals and halogenated monovalent hydrocarbon radicals, R' and R" are selected from divalent hydrocarbon radicals and halogenated divalent hydrocarbon radicals, and R''' is selected from trivalent organo radicals and tetravalent organo radicals.

Radicals included by R, for example, aryl radicals such as phenyl, xylyl, tolyl, naphthyl, chlorophenyl, etc.; alkyl radicals such as methyl, ethyl, propyl, butyl, pentyl, etc.; alkenyl radicals such as vinyl, allyl; halogenated alkyl radicals such as trifluoropropyl, tetrafluorobutyl, etc. Radicals included by R' and R" are, for example, arylene radicals, such as phenylene, tolylene, xylyene, naphthylene, etc.; alkylene radicals such as methylene, ethylene, propylene, butylene, pentylene, etc.; halogenated derivatives such as chloroethylene, chlorophenylene, etc; alkylene substituted arylene radicals, such as ethylenephenylene, propylenephenylene, etc. Radicals included by R''' are, for example,

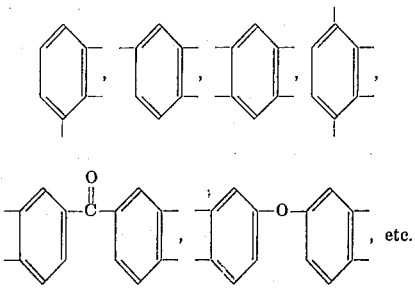

The polyamides of the present invention can be made by effecting reaction between a bis(aminoorganosilyl)hydrocarbon or "diamine" of the formula, (2) 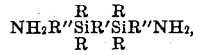

and certain organic carboxylic acid anhydrides or organic dicarboxylic acids to provide for the production of polyamides having units of formula (1).

Included by the organic carboxylic acid anhydrides which can be employed in the practice of the invention are dianhydrides of the formula, (3) 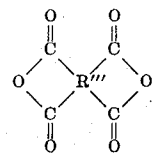

and carboxylic acid anhydrides of the formula, (4) 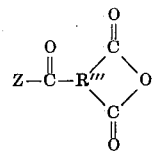

where R''' is as previously defined, and Z is selected from halogen and hydroxy.

Among the organic dianhydrides of formula (3), there are included, pyromellitic dianhydride; 2,3,6,7-naphthalene tetracarboxylic dianhydride; 3,3',4,4'-diphenyl tetracarboxylic dianhydride; 1,2,5,6-naphthalene tetracarboxylic dianhydride; 2,2',3,3'-diphenyl tetracarboxylic dianhydride; 2,2-bis(3,4-dicarboxyphenyl) propane dianhydride; bis(3,4-dicarboxyphenyl)sulfone dianhydride; 3,4,9,10-perylene tetracarboxylic dianhydride; bis(3,4-dicarboxyphenyl) ether dianhydride; 2,2-bis(2,3-dicarboxyphenyl) propane dianhydride; 1,1-bis(2,3-dicarboxyphenyl) ethane dianhydride; 1,1-bis(3,4-dicarboxyphenyl) ethane dianhydride; bis(2,3-dicarboxyphenyl) methane dianhydride; bis(3,4-dicarboxyphenyl) methane dianhydride; bis(2,3-dicarboxyphenyl) sulfone dianhydride; benzophenone tetracarboxylic dianhydride, etc., and mixtures thereof.

Some of the carboxylic acid anhydrides included by formula (4), are for example,

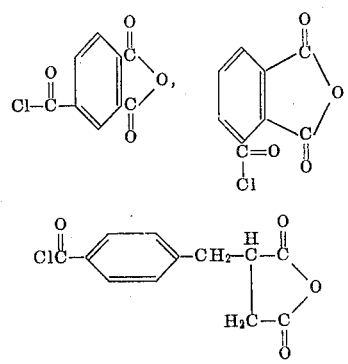

In particular instances, carboxylic acid anhydrides of formula (4) can be employed as a dianhydride when converted to esters and amides as taught by Holub U.S. Pat. No. 3,410,875 and Loncrini U.S. Pat. No. 3,182,073 assigned to the same assignee as the present invention.

Among the organic dicarboxylic acids or derivatives, such as the corresponding acid halide which can be employed with the diamines to make the polyamides of the invention are compounds such as,

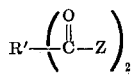

wherein R' and Z are previously defined. Included, for example, are dicarboxylic acid chlorides such as,

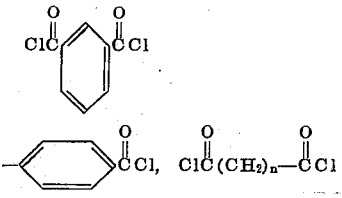

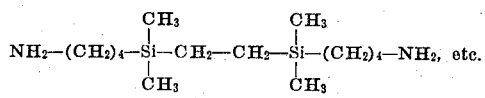

where n is 0 to 12 carbon atoms.

The diamines of formula (2) and methods for making them are shown in our copending application Ser. No. 880,922, filed concurrently herewith. As taught in our aforementioned application, these diamines can be made by hydrogenating the corresponding bis(cyanoorgano) hydrocarbons. The latter compounds can be made by effecting the addition between the appropriate bis(silylhydride)hydrocarbon and an aliphatically unsaturated nitrile. There are included by the diamines of the present invention, silylalkyleneamines, such as,

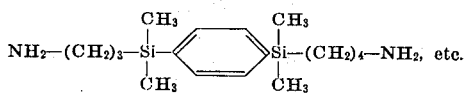

silylaryleneamines such as,

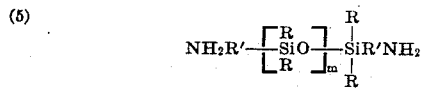

In addition to the above bis(aminoorganosilyl)hydrocarbons, the diamines also can include a mixture of such diamines and up to 50 percent by weight of the mixture of bis(aminosiloxanes) of the formula, (5)

where m is an integer equal to 1 to 100, organic diamines of the formula, (6)        $Q(NH_2)_2$ or mixtures of such bis(aminosiloxane) and organic diamines, where Q is a divalent organic radical selected from heterocyclic radicals, R' radicals, and —R'GR'— radicals, where G is a divalent radical selected from —O—,

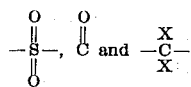

where X is selected from hydrogen, methyl, and trihalomethyl radicals, such as trifluoromethyl, trichloromethyl, etc.

Included by the bis(aminosiloxanes) of formula (5) are, for example,

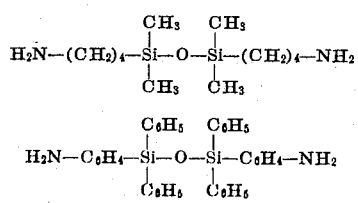

and

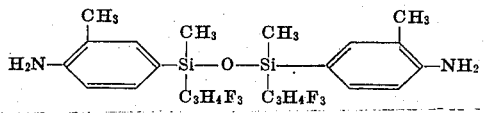

These bis(aminosiloxanes) and methods for making them are shown in Holub U.S. Pat. No. 3,325,450 and No. 3,435,002, assigned to the same assignee as the present invention.

Among the organic diamines of formula (6), there are included, for example, meta-phenylene diamine; paraphenylene diamine; 4,4'-diamino-diphenyl propane; 4,4'-diamino-diphenyl methane; benzidine; 4,4'-diamino-diphenyl sulfide; 4,4'-diamino-diphenyl sulfone; 3,3'-diamino-diphenyl sulfone; 4,4'-diamino-diphenyl ether; 2,6-diamino-pyridine; bis(4-amino-phenyl)phosphine oxide; bis(4-amino-phenyl)-N-methyl-amine; 1,5-diamino-naphthalene; 3,3'-dimethyl-4,4'-diamino-biphenyl; 3,3'-dimethoxy benzidine; 2,4-bis(beta-amino-t-butyl)toluene; bis-(para-beta-amino-t-butyl-phenyl) ether; para-bis(2-methyl-4-amino-pentyl)benzene; para-bis-(1,1-dimethyl-5-amino-pentyl)benzene; m-xylylene diamine; p-xylylene diamine; bis(para-amino-cyclohexyl)methane; ethylene diamine; propylene diamine; hexamethylene diamine; heptamethylene diamine; octamethylene diamine; nonamethylene diamine; decamethylene diamine; 3-methyl-heptamethylene diamine; 4,4-dimethylheptamethylene diamine; 2,11-diamino-dodecane; 1,2-bis-(3-amino-propoxy)ethane; 2,2-dimethyl-propylene diamine; 3-methoxy-hexamethylene diamine; 2,5-dimethylhexamethylene diamine; 2,5-dimethylheptamethylene diamine; 5-methyl-nonamethylene diamine; 1,4-diamino-cyclo-hexane; 1,12-diamino-octadecane; 2,5-diamino-1,3,4-oxadiazole; $H_2N(CH_2)_3O(CH_2)_2O(CH_2)_3NH_2$; $H_2N(CH_2)_3S(CH_2)_3NH_2$; $H_2N(CH_2)_3N(CH_3)(CH_2)_3NH_2$; and mixtures thereof.

In accordance with the practice of the invention, the polyamides can be prepared by effecting contact between substantially equal molar amounts of the organic carboxylic acid anhydride, the organic dicarboxylic acid, or mixtures thereof, referred to hereinafter as the "organic carboxy compound", and the diamine, in the presence of an organic solvent for the reactants and the resulting polyamide.

The order of addition of either the organic carboxy compound or the diamine is not critical as long as contact is achieved in the presence of a suitable organic solvent. Among the organic solvents which can be employed are, for example, N,N-dimethylformamide, N,N-dimethylacetamide, N,N-diethylformamide, N,N-diethylacetamide, N,N-dimethyl-methoxyacetamide, dimethylsulfoxide, N-methyl-2-pyrrolidone, pyridine, dimethylsulfone, hexamethylphosphoramide, tetramethylenesulfone, phenol, phenol-water mixtures, and dimethyltetramethylenesulfone. Mixtures of these solvents with other inert organic solvents such as benzene, benzonitrile, dioxane, beta-ethoxyethylacetate, butyrolactone, xylene, toluene and cyclohexane, can also be employed.

It is preferred to effect reaction between the organic carboxy compound and the diamine at ambient temperatures employing cooling, if necessary, along with agitation so as to maintain the temperature of the mixture below 40° C to minimize the production of polyimide. Depending upon the reactants employed, and the conditions, such as temperature, degree of agitation, etc., the polyamide is formed within about 30 minutes to one hour or less or as long as three hours or more. The termination of the reaction can be readily determined by the substantial increase in the viscosity of the mixture. The amount of organic solvent, therefore, should be sufficient to produce a homogeneous solution to reactants and polyamide and yet not be too viscous so as to introduce handling problems. Optimum concentrations are in the range of from 5 to 40 percent by weight of the polyamide and 60 to 95 percent by way of the solvent, depending upon its end use.

The polyamides which can be employed in the practice of the invention can have an average value of from 10 to 300 polyamide units.

Some of the polyamides which can be made in accordance with the practice of the invention can have the following formulas:

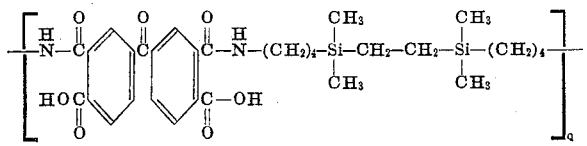

where g can have an average value of about 200;

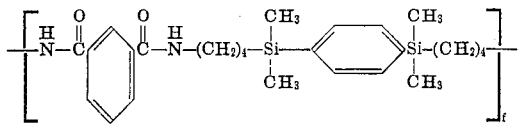

where f can have an average value of about 150;

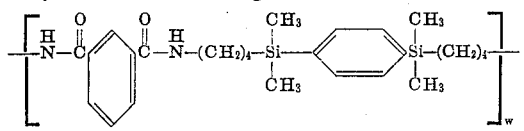

where w can have an average value of about 100, etc.

The above polyamides can readily be converted to polyimides when they are heated or cast from solution with temperatures in the range of between 100° C to 280° C. Among the various uses to which the polyamides of the present invention can be employed are, for example, coating insulation materials such as wire enamels, corrosion resistant coatings, etc., molding compounds, reinforced with glass fibers, carbon fibers, crushed quartz, carbon black, clay, etc.

In order that those skilled in the art will be better able to practice the invention, the following examples are given by way of illustration and not by way of limitation. All parts are by weight.

EXAMPLE 1

There were added 3.22 parts of 3,3',4,4'-benzophenonetetracarboxylic dianhydride to a solution of 3.35 parts of 1,4-bis[δ-aminobutyldimethylsilyl] benzene in about 40 parts of N-methylpyrrolidone while the mixture was stirred and maintained under a nitrogen atmosphere. The resulting mixture was stirred for an additional hour while the temperature was maintained at about room temperature. A viscous solution was produced. Based on method of preparation, the solution contained a polyamide acid consisting essentially of chemically combined units of the formula,

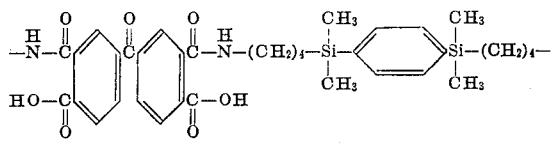

A film was cast from the above polyamide acid solution by pouring it onto a glass substrate and heating it under atmospheric conditions. A cured film was obtained at 120° C after one hour, which was further cured for an additional hour at 150° C, followed by heating the film for another hour at 200° C and another hour at 250° C. As a result of the cure, the film was a silphenylene modified polyimide. It was found that the film is a valuable high temperature resistant insulator.

EXAMPLE 2

There were added 3.22 parts of 3,3',4,4'-benzophenonetetracarboxylic acid dianhydride to a solution of 0.99 parts of p,p'-methylenedianiline and 1.68 parts of 1,4-bis-[δ-aminobutyldimethylsilyl] benzene while the solution was stirred and maintained at about room temperature under a nitrogen atmosphere. The mixture was stirred until the solution achieved a maximum viscosity which was approximately one hour. Based on method or preparation, a polyamide acid was made consisting essentially of chemically combined units of the formula,

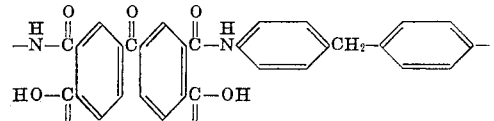

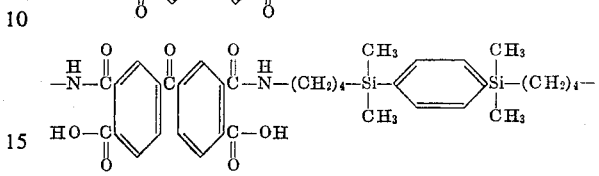

A film was cast from the above polyamide solution by pouring it onto a glass substrate. The film was cured to a silphenylene modified polyamide by heating it at 100° C for one hour, 150° C for one hour, 200° C for one hour and 250° C for one hour. The film had a cut-through of 205° C when measured in accordance with the test procedure described by Precopio et al. U.S. Pat. No. 2,936,296, assigned to the same assignee as the present invention. In addition, the silphenylene modified polyimide film exhibits superior corona resistance as compared to a silicon-free polyimide film made by utilizing p-p'-methylenedianiline in place of the diamine mixture containing the 1,4-bis[δ-aminobutyldimethylsilyl] benzene.

EXAMPLE 3

A mixture of 1.44 parts of 1,2-bis(δ-aminobutyl-dimethylsilyl) ethane, by 25 parts of dry N-methylpyrrolidone and 1.09 parts of pyromellitic dianhydride was stirred for one hour at room temperature. Based on method of preparation, there was obtained a polyamide acid consisting essentially of chemically combined units of the formula,

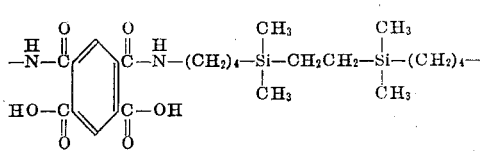

A film was cast from the above solution by pouring it on an aluminum substrate and heating the substrate to a temperature to 200° C. A film was formed on the surface of the aluminum having valuable insulating and adhesive properties.

EXAMPLE 4

A mixture of 1.68 parts of 1,4-bis(δ-aminobutyldimethylsilyl) benzene, 1.38 parts of 1,4-bis(δ-aminobutyl-tetramethyl)disiloxane, 0.54 parts of m-phenylenediamine, 3.15 parts of 4-chloroformylphthalic anhydride and 25 parts of N-methylpyrrolidone was stirred for one hour at room temperature. The mixture was poured into water to effect the precipitation of a product which was recovered by filtering it from the aqueous mixture. Based on method of preparation, the product was a polyamide acid consisting essentially of chemically combined units of the formula,

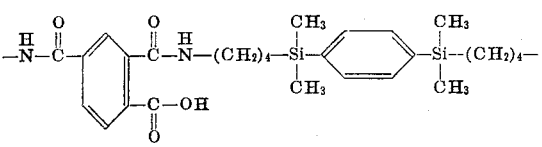

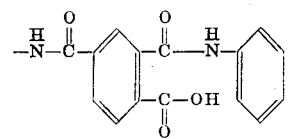

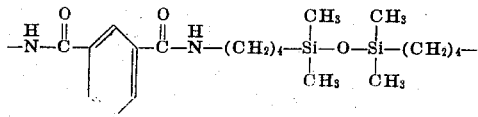

The polymer softened at 150° C. A solution of the polymer in N-methylpyrrolidone was cast on an aluminum substrate which produced a yellow clear amideimide film when heated for 30 minutes at from 100°-200° C having valuable insulating properties.

EXAMPLE 5

A mixture was stirred consisting of 24 parts of N-methylpyrrolidone, 1.98 parts of p,p'-methylenedianiline, 2.88 parts of 1,2-bis(δ-aminobutyldimethylsilyl)ethane and 8.2 parts of the esterdianhydride of ethyleneglycol and trimellitic anhydride. While the mixture was stirring at room temperature, it became very viscous and 46 additional parts of N-methylpyrrolidone were added. A viscous solution was obtained after stirring the resulting mixture for one hour at room temperature. Based on method of preparation, there was obtained a polyamide acid consisting essentially of chemically combined units of the formula,

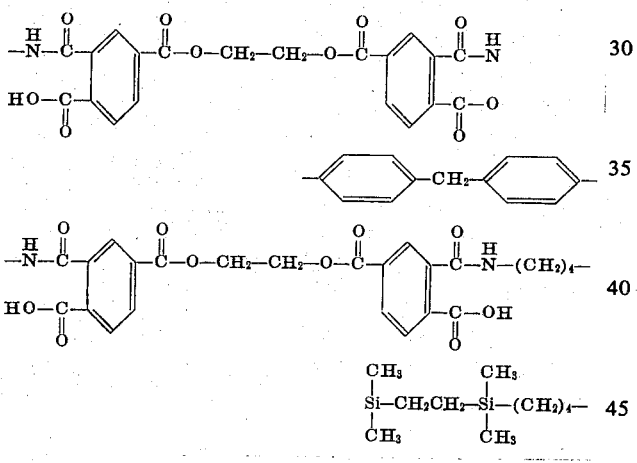

The above solution is heated at 200° C for one hour to convert the polyamide acid to the imide form. The mixture is then poured into methanol to precipitate product. The product is recovered by filtering the mixture and blended with glass fibers to produce a blend containing 30 parts of glass fiber per 100 parts of polymer. The resulting mixture was heated in a mold for 5 minutes at 260° C to produce a glass reinforced molded product exhibiting valuable insulating properties having improved corona resistance.

A mixture was stirred consisting of 40 parts of N-methylpyrrolidone, 2.88 parts of 1,2-bis(δ-aminobutyldimethylsilyl)ethane, 1.98 parts of p,p'-methylenedianiline, 5 parts pyridine, and 4.06 parts of isophtholoylchloride. The mixture was stirred for one hour at ambient temperatures. The mixture was then poured into a solution of methanol containing about 10 percent by weight of water to effect the precipitation of product. Based on method of preparation, the product was a polyamide consisting essentially of chemically combined units of the formulas below,

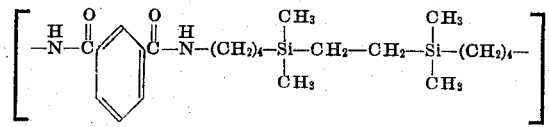

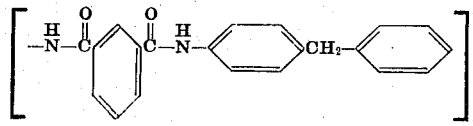

EXAMPLE 6

When 3.36 parts of 1,4-bis[δ-aminobutyldimethylsilyl] benzene was mixed at room temperature with 2.03 parts of isophthaloylchloride, 2 parts of pyridine and 25 parts of N-methylpyrrolidone, a viscous solution was obtained in 1 hour. When the mixture poured into water, a white product was obtained. Based on method of preparation, the product was a polyamide consisting essentially of the following chemically combined units:

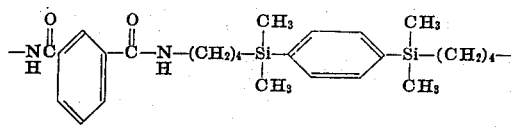

A film is cast on aluminum from a 10 percent N-methyl pyrrolidone solution of the above polyamide. It cures to a valuable polyamide insulator when heated at 200° C for 1 hour.

Although the above examples show only a very few of the very many polyamides which can be made by the method of the invention, it should be understood that the present invention is directed to a much broader class of polyamides consisting essentially of units of formula (1) made by effecting reaction between a diamine of formula (2) and a carboxylic acid compound such as formulas (3) and (4).

What is claimed is:

1. A polyamide consisting essentially of chemically combined units of the formula,

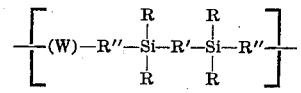

where W is a polyamide unit having the formula,

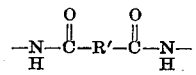

where R is selected from the group consisting of monovalent hydrocarbon radicals and halogenated monovalent hydrocarbon radicals, R' and R'' are selected from the group consisting of divalent hydrocarbon radicals and halogenated divalent hydrocarbon radicals.

2. A polyamide consisting essentially of combined units of the formula,

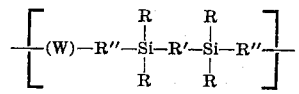

where W is a polyamide acid unit of the formula,

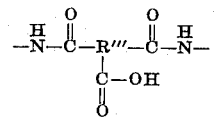

R is selected from the group consisting of monovalent hydrocarbon radicals and halogenated monovalent hydrocarbon radicals, R' and R'' are selected from the group consisting of divalent hydrocarbon radicals and halogenated divalent hydrocarbon radicals, and R''' is selected from

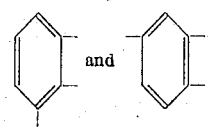 and 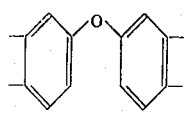

3. A polyamide acid having recurring units of the formula,

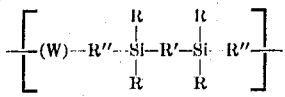

where W is a polyamide acid unit selected from the group consisting of,

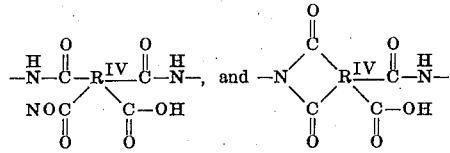

where R is selected from the group consisting of monovalent hydrocarbon radicals and halogenated monovalent hydrocarbon radicals, R' and R'' are selected from the group consisting of divalent hydrocarbon radicals and divalent hydrocarbon radicals, and R$^{IV}$ is selected from the group consisting of,

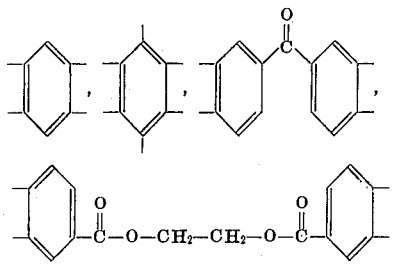

and

4. A polyamide acid in accordance with claim 3, where W is

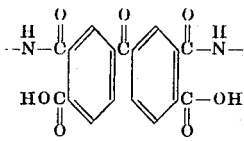

5. A polyamide in accordance with claim 3, where W is

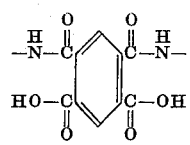

6. A polyamide acid in accordance with claim 2, where W is

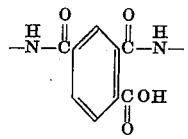

7. A polyamide acid in accordance with claim 3, where W is

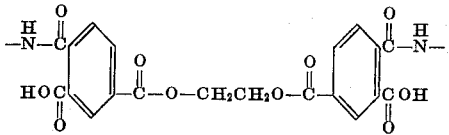

* * * * *